United States Patent
Finarov

(10) Patent No.: US 7,251,043 B2
(45) Date of Patent: Jul. 31, 2007

(54) METHOD AND SYSTEM FOR MEASURING THIN FILMS

(75) Inventor: Moshe Finarov, Rehovot (IL)

(73) Assignee: Nova Measuring Instruments Ltd., Rehovot (IL)

(*) Notice: Subject to any disclaimer, the term of this patent is extended or adjusted under 35 U.S.C. 154(b) by 289 days.

(21) Appl. No.: 10/494,577

(22) PCT Filed: Nov. 10, 2002

(86) PCT No.: PCT/IL02/00898

§ 371 (c)(1),
(2), (4) Date: May 6, 2004

(87) PCT Pub. No.: WO03/040771

PCT Pub. Date: May 15, 2003

(65) Prior Publication Data

US 2005/0002624 A1   Jan. 6, 2005

(30) Foreign Application Priority Data

Nov. 8, 2001 (IL) .................................... 146386

(51) Int. Cl.
*G01B 11/02* (2006.01)
*G01B 11/06* (2006.01)

(52) U.S. Cl. ..................................... 356/503; 356/632
(58) Field of Classification Search ................ 356/503, 356/504, 477, 630, 632, 364, 485, 492; 250/559.27, 250/559.28
See application file for complete search history.

(56) References Cited

U.S. PATENT DOCUMENTS 6,608,676 B1 * 8/2003 Zhao et al. .............. 356/237.2

* cited by examiner

*Primary Examiner*—Gregory J. Toatley, Jr.
*Assistant Examiner*—Marissa J Detschel
(74) *Attorney, Agent, or Firm*—Dekel Patent Ltd.; David Klein

(57) ABSTRACT

An optical system is presented for use in a measurement system (100) for use in measurements of thin films of a workpiece (W), the system comprising an optical assembly (14), comprising illuminator assembly, a detector assembly, and a light directing assembly (FA-OF) for directing illuminating light to a plurality of measurement sites in the workpiece (W) arranged in an array of substantially concentric ring-like regions, such that an area defined by the measurement sites within one of the substantially concentric ring-like regions is substantially equal to that of the other substantially concentric ring-like region.

30 Claims, 2 Drawing Sheets

METHOD AND SYSTEM FOR MEASURING THIN FILMS

FIELD OF THE INVENTION

Present invention relates to the field of semiconductor manufacturing, and more specifically to the optical methods and tools for measuring thickness and optical parameters of thin films.

BACKGROUND OF THE INVENTION

Several optical methods are currently used for measuring thickness of thin films in semiconductor workpiece (e.g. wafer) manufacturing, mainly based on spectrophotometry and ellipsometry. There are different configurations of optical measuring tools: in-situ, performing measurements during the processing; stand-alone (SA) tools having individual cassette-to-cassette load/unload means and integrated tools, installed within or adjacent to processing equipment for layer deposition (like CVD cluster tools of Applied Materials. USA) or for layer removal (like CMP polishers of Applied Materials, EBARA, SFI, etc.) Such integrated metrology tools provide accurate measurements of each wafer immediately after the processing, e.g. layer deposition/removal. The examples of such integrated metrology (IM) tools are NovaScan 840 of Nova Measuring Instruments, Israel, NanoSpec 9000 of Nanometrics, USA, etc.

Both SA and IM tools apply precise optical measurements, mainly based on spectral reflectometry, to the pre-determined small measurement sites within the wafer's pattern structure. In order to reach this measurement site, the pattern recognition technique based on image acquisition and processing is applied accompanied by precise positioning and auto-focusing.

In order to measure the layer thickness distribution (uniformity) over the whole wafer, such pre-measurement cycle of pattern recognition, precise positioning and spectral measurement is repeated in number of measurement sites over the wafer, e.g. 25 points along the wafer of diameter=300 mm. Performance of entire measurement cycle, i.e. including pre-measurement cycle require significant amount of time and in some cases are the bottle-neck of the equipment run rate.

The main advantage of the above technique is the use of pre-determined measurement sites with known stack structure, so measurement data interpretation is done on a basis of accurate optical model of measured thin film structure, providing ultimate accuracy and repeatability of the film thickness determination.

In some case, it is more important to reach a maximal throughput (minimal measurement time) on account of some loss of measurement accuracy. For example, when the film thickness is relatively high (several thousands of Å) the accuracy and repeatability of single Å of existing IM tools may be not so needed. However, the higher measurement speed of several seconds for multiple measurements on wafer is very important.

For such cases so-called "large spot" measurement techniques are being developed. Systems using "large spot" do not require pattern recognition and precise positioning means. This technique is based on extracting useful average information about the top layer from mixed spectrum received from different parts of wafer pattern with different layer structures. Such techniques are disclosed for example the in U.S. Pat. Nos. 5,872,633: 5,900,633 and PCT patent Application No. PCT/IL99/00466 (Publication. No. WO 00/12958)

Being limited in measurement accuracy and repeatability, such technique still is useful for some applications. The main advantage of this technique is high measurement speed because such procedures as wafer alignment; pattern recognition and precise positioning are not needed. Moreover, applying a relatively large spot of about 20 mm, the light intensity reaching the photodetector is high and the integration time of photodetectors needed for required SNR (signal-to-noise ratio) is very small about 1-2 orders of magnitude smaller than for "small spot" IM or SA tools, where the integration time for single measurement may be as large as 1 second or the like.

The main limitation of the "large spot" technique is its low spatial resolution. It is especially critical for cases of high non-uniformity within a relatively small wafer's area.

For example, after CMP processing of silicon oxide layer, a high non-uniformity of the film thickness, especially in the wafer edge areas is observed. Thus, large spot of about 20 mm and larger can not provide needed information, when resolution of about 1 mm is needed. Reducing the spot size to the level of 1 mm will deteriorate drastically the measurement accuracy and in many cases makes this measurement impossible because of too strong dependence of received spectrum on the pattern structure.

Thus, there is a need in the art for measurement technique providing advantages of "large spot" and "small spot" techniques.

SUMMARY OF THE INVENTION

There is accordingly a need in the art to facilitates an optical measurements of thin films parameters of semiconductor workpiece, such as a semiconductor wafer, by providing a novel optical system and method for implementation a "large spot" technique in such manner that provides desired spatial resolution, especially in the edge area of the wafer, without sufficiently reducing the measurement's accuracy and repeatability.

The main idea of the invention consists of combining the advantages of both "large spot" and small spot" approaches by configuring the measurement sites as an array of substantially concentric ring-like regions with substantially equal area.

There is thus provided according to one broad aspect of the present invention, a method for use in measurements of thin films, the method comprising illuminating a plurality of measurement sites in the workpiece and detecting light responses of the measurement sites, wherein the plurality of measurement sites define an array of substantially concentric ring-like regions such that an area defined by the measurement sites within one of the substantially concentric ring-like regions is substantially equal to that of the other substantially concentric ring-like region.

In one embodiment of the invention, the array of substantially concentric ring-like regions is created by substantially concentric ring-like optical fiber bundles applied to the workpiece, the ring-like fiber bundles having different radii and widths.

In another embodiment of the invention the array of substantially concentric ring-like regions is created by creating an illuminating spot on the workpiece and scanning the workpiece with the illuminating spot while rotating the workpiece with a predetermined velocity and providing a relative displacement between the workpiece and the illuminating spot along a radius of the workpiece.

Preferably, the velocity of the displacement between the workpiece and the illuminating spot decreases from the center of the workpiece towards the edge or alternatively, the velocity of the displacement between the workpiece and the illuminating spot along a radius of the workpiece is substantially constant and the size of the illuminating spot is variable.

There is provided according to another broad aspect of the present invention, a method for use in measurements of wafer's top layer radial thickness distribution, the method comprising illuminating a plurality of measurement sites in the workpiece and detecting light responses of the measurement sites, wherein the plurality of measurement sites define an array of substantially concentric ring-like regions such that an area defined by the measurement sites within one of the substantially concentric ring-like regions is substantially equal to that of the other substantially concentric ring-like region.

Preferably, the detecting of light responses is performed by a spectrophotometer.

There is provided according to another broad aspect of the present invention, an optical system for use in measurements of thin films of a workpiece, the system comprising an illuminator assembly, a detector assembly, and a light directing assembly for directing illuminating light to a plurality of measurement sites in the workpiece arranged in an array of substantially concentric ring-like regions, such that an area defined by the measurement sites within one of the substantially concentric ring-like regions is substantially equal to that of the other substantially concentric ring-like region.

In one embodiment of the invention the light directing assembly is formed by a plurality of fiber-optic bundles, each ended by ring-like optical fixtures.

Preferably, the light directing assembly comprises light distribution assembly that may be formed by a rotatable mirror.

Preferably, the detector assembly comprises a spectrophotometer.

According to yet another broad aspect of the present invention, there is provided an optical measurement system for measurements of thin films of a workpiece, the system comprising a handler for handling the workpiece, illuminator assembly, a detector assembly, and a light directing assembly for directing illuminating light to a plurality of measurement sites in the workpiece arranged in an array of substantially concentric ring-like regions, such that an area defined by the measurement sites within one of the substantially concentric ring-like regions is substantially equal to that of the other substantially concentric ring-like region.

In one embodiment of the invention the handler is rotatable and movable along horizontal axis.

In another embodiment of the invention the handler is rotatable and said light directing assembly is movable along horizontal axis.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The main idea of the invention is that the light spot is configured in a form of annular ring, preferably having the same center (coincide) with the measured wafer.

The entire area of such ring-like spot is large enough, about the same as the regular circular spot of a diameter=20 mm or even greater. Since in the wafer edge vicinity the diameter of such annular ring is very large, it allows very small width of the ring and thus the high spatial resolution of the measurements near the wafer edge.

Such ring-like shape of the light spot allows measuring very accurately the thickness of radial non-uniformity that is typical for the most existing deposition and removal processes. The area $S_r$ of ring may be calculated as $S_r \approx 2\pi r \Delta r$, wherein r is an average ring's radius and $\Delta r$—is a ring width. Lets consider $S_{min}$ is the minimal area of signal collection/illumination needed for "large spot" spectral measurements. The relationship between the ring's radius r and a ring width $\Delta r$ can be expressed using the value of the minimal area $S_{min}$ equal to that of spot having diameter 20 mm. In this case, $S_{min}=\pi(20/2)^2$ mm$^2$, i.e. $S_{min}=100\ \pi$ mm$^2$.

Thus, the relationship between the ring's radius r and a ring width $\Delta r$ can mathematically be expressed in the following manner:

$$\Delta r = 100\ \pi/2\pi r = 50/r\ [mm].$$

From this expression it can be seen that in the wafer's edge vicinity (for 300 mm wafers) the radial resolution of measurements is about 0.3 mm and less than desired (0.5 mm).

Figure 1:
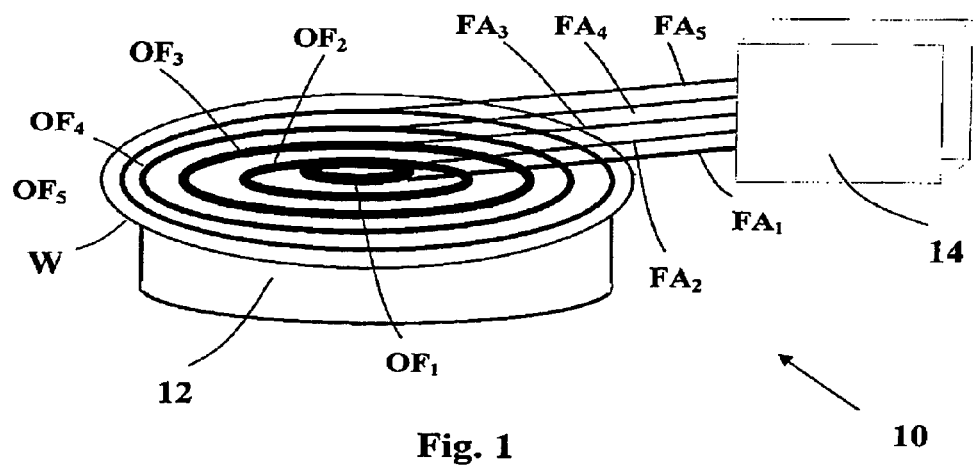
FIG. 1 schematically illustrates an optical system according to one embodiment of the present invention, with ring-like light directing assembly.

Referring to FIG. 1, there is schematically illustrated optical measurement system 10 constructed according to one example of the invention. In FIG. 1, a workpiece W (for example semiconductor wafer) held statically on a chuck 12 is illuminated and viewed by one of optical fixtures $OF_1$-$OF_5$ (five in the presents example), which directs light downward onto the surface of wafer W, preferably normally thereto. Each of the optical fixtures $OF_1$ are formed by a plurality of fibers (light-guides) of fiber-optic bundles $FA_1$-$FA_5$, having an external tip coupled to an optical assembly 14. As further shown in FIG. 1, each of the optical fixtures OF, excluding $OF_1$ has a ring-like form with plurality of ends of fiber-optic bundles $FA_1$-$FA_5$ distributed thereon. Optical fixture $OF_1$, located above the central portion of the wafer W, has a circular form with desired cross-section, preferably providing illumination spot of diameter about 20 mm on the wafer's surface, which is defined by size of wafer's die. It should be noted, that total cross-section of the optical fixtures OF, and fiber-optic bundles $FA_1$-$FA_5$ correspondingly, preferably are equal, that can be reached by using the same number of optical or fibers. Such a construction provides substantially equal illumination spot areas of each optical fixture $OF_1$-$OF_5$.

Figure 2:
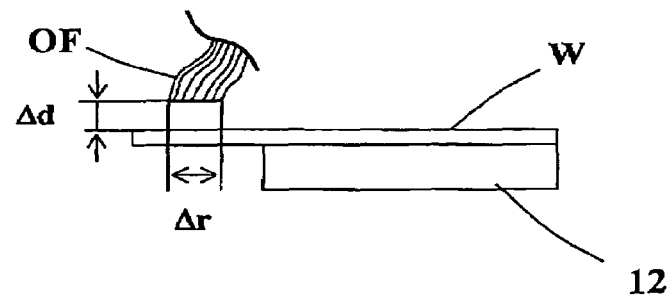
FIG. 2 more specifically illustrates a section view of one of the optical fixtures and its location relative to the surface of the wafer W.

FIG. 2 illustrates a section view of one of the optical fixtures $OF_2$-$OF_5$ and its location relative to the surface of the wafer W. The optical fixture OF is formed by the end of optical fibers and has a width providing an illuminating ring-like spot on the surface of the wafer W of width about $\Delta r$. Due to some divergence of the illuminating beam, optical fixtures $OF_1$-$OF_5$ should be located relatively close to the wafer's surface, preferable distance $\Delta d$ is about 1 mm. Otherwise, complicated micro lens assemblies should be provided between the optical fixtures and wafer's surface.

Figure 3:
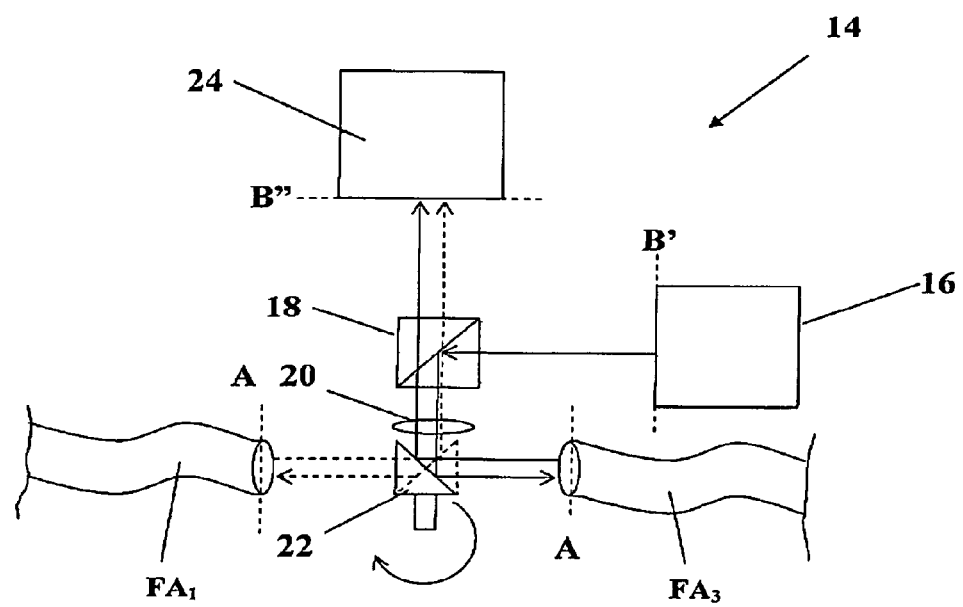
FIG. 3 schematically illustrates one embodiment of optical assembly constructed according to the invention.

Referring to FIG. 3, there is schematically illustrated one embodiment of optical assembly 14 constructed according to the invention. Optical assembly 14 as illustrated in FIG. 2, comprises a broadband light source 16, which directs the light onto a beam-splitter 18. Xe high stability lamp of 75 W commercially available from Hamamatsu or Ushio, Japan may be used as light source 16. The beam-splitter 18 reflects the light beam and directs it through lens 20 onto a mirror 22, which selectively reflects the light onto common bundle tips of one of the fiber-optic bundles $FA_1$-$FA_5$ (only two of them $FA_1$ and $FA_3$ are shown). The light beam is transmitted trough one of the fiber-optic bundles $FA_1$-$FA_5$ and corresponding optical fixture $OF_1$-$OF_5$ onto the wafer's surface in the shape of ring-like spot of different radius and widths. The reflected light beam is collected by the same optical fixture $OF_1$-$OF_5$ and transmitted back trough the beam splitter 18 and reaches the spectrophotometric detector 24. Spectrophotometric detector MMS-1, commercially available from Zeiss, Germany can be used as spectrophotometric detector 24. Light source 16 and spectrophotometric detector 24 are located in the planes B' and B". Planes B' and B" are conjugate planes of the lens 20.

Mirror 22 is rotatable, preferably step-by-step, about an axis AP by a suitable driver (not shown). In other words, the mirror 22 is oriented at 45° to the vertical axis AP, and rotates in the horizontal plane, the input faces of the optical fibers being arranged in a spaced-apart relationship in the horizontal plane. Thus, the rotation of the mirror 22 will result in the sequential illumination of the bundle tips of one of the fiber-optic bundles $FA_1$-$FA_5$. The synchronization of the rotation of the mirror 22 and reading the detector 24 may be controlled by the programming means of the control unit (not shown).

Figure 4:
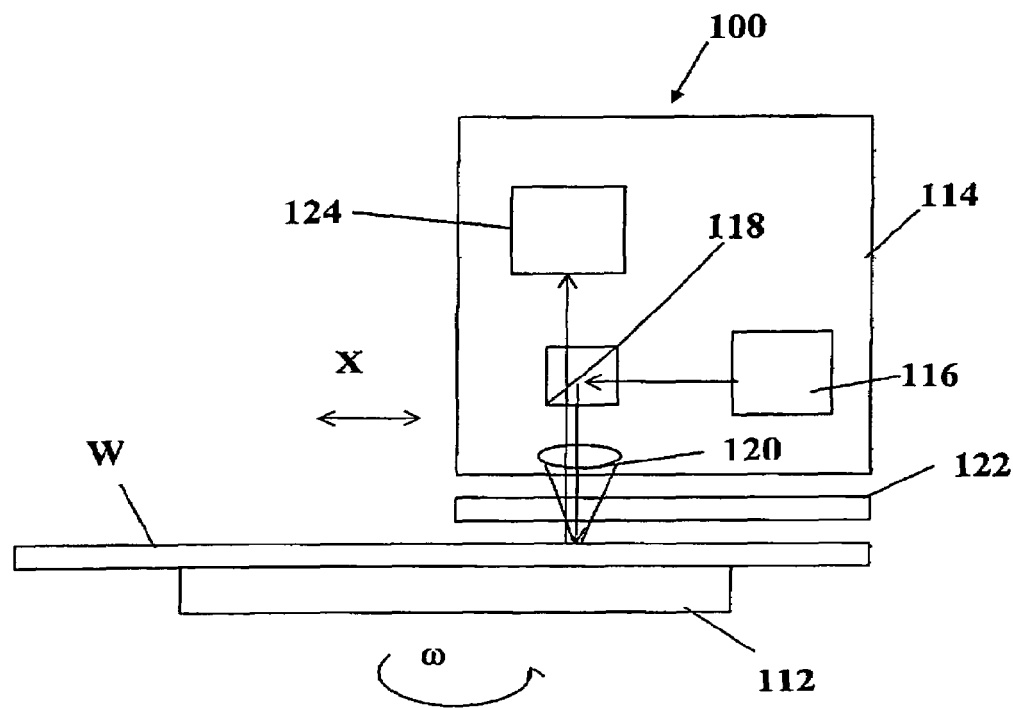
FIG. 4 schematically illustrates a section view of an optical measurement system according to another embodiment of the present invention

Thus, during one rotation all (or selective) optical fixtures $OF_1$-$OF_5$ are operated to illuminate and collect reflected signal from radially distributed concentric ring-shaped measurements sites. Entire wafer measurements including calculation of radial thickness distribution (non-uniformity) are performed within time period of single seconds. FIG. 4 illustrates a section view of an optical measurement system 100 having a somewhat different construction as compared to the system 10. The system 100, similarly to the system 10, comprises a chuck 112 with a workpiece W (semiconductor wafer) held thereon, and an optical assembly 114. Contrary to the example of FIG. 1, chuck 112 is rotatable by any suitable drive (not shown), preferably with constant angular velocity. The optical assembly 114 comprises a broad-band light source 116, which directs the light onto beam-splitter 118, that reflects and directs the light onto objective lens 120 and the wafer's plane W. Preferably, the spot size formed by optical system is about 0.5 mm, providing desired spatial resolution of measurements. The reflected from the wafer's plane W light beam is transmitted back trough the objective lens 120 and beam splitter 118, and reaches the spectrophotometric detector 124 and is used for spectroscopic measurements. Additionally, in order to avoid contaminations, the optical assembly 114 is separated from the wafer's surface by an optical window 122. In order to perform measurements of radial thickness distribution (non-uniformity) the optical assembly 114 is designed for linear movement along the axis X and provided by appropriate drive with appropriate control unit (not shown). Alternatively, the chuck 112 can be linearly movable along the X-axis in addition to its rotation. It should be noted, that preferably, the optical window 122 has a narrow strip-like shape of a length about the wafer's radius, which allows performing desired measurements using minimal size of the window.

The optical measurement system 110 operates in the following manner. Preferably, the wafer W is rotated with a constant speed and a certain integration time for spectrophotometric detector 124 is set. In order to satisfy the above-mentioned conditions, i.e. to perform measurements on strip-like measurements sites having substantially equal areas, the linear movement of optical assembly 114 along the wafer's radius (X-axis) is performed with varying velocity and is inversely proportional to the radius (i.e. to the distance between the wafer's center and measurement site define by the optical assembly 114 along X-axis). To this end, the velocity is maximal in the vicinity of wafer's center and slows down with increasing the radius. The advantage of such construction is that it allows performing of continues measurements along the wafer radius. This arrangement requires movable stage for optical assembly 114 (or chuck 112) and providing rotatable chuck 112 with wafer's clamping during rotation, e.g. by using vacuum system.

Additionally, in order to satisfy the above-mentioned conditions, i.e. to perform measurements on strip-like measurements sites having substantially equal areas, the optical assembly 114 can be linearly moved with constant velocity. In that case, illumination spot is variable, e.g. having slit-like shape formed by spherical-cylindrical lens and variable aperture. The length of the slit (along wafer's radius) is changes with the displacement along the wafer's radius. To this end, the length is maximal in the wafer's center vicinity and is decreased while moved towards the wafer's edge.

Preferably, both systems 10 and 110 are provided with some kind of centering (positioning) assembly. Such centering assemblies are well-known in the art, e.g. those disclosed in the U.S. Pat. No. 6,212,961 or and do not require further description Finally, it will be appreciated by persons skilled in the art that the present invention is not limited to what has been particularly shown and described hereinabove. For example, optical light distribution system with mechanical or electro-optical shutters may be used with one light source, or for extremely high throughput, each optical fixture OF may be provided by its own light source. Additionally, oblique illumination, different polarization, variable rotation velocity are applicable in the present invention. Rather the scope of the present invention is defined only by the claims that follow.

The invention claimed is:

1. A method for use in measurements of thin films, the method comprising illuminating a plurality of measurement sites in a semiconductor workpiece and detecting light responses of the measurement sites, wherein the plurality of measurement sites defines an array of substantially concentric ring-like regions such that an area defined by the measurement sites within one of the substantially concentric ring-like regions is substantially equal to that of the other substantially concentric ring-like region, and measuring thin film parameters of said workpiece in the measurement sites within one of the substantially concentric ring-like regions.

2. The method according to claim 1, wherein said array of substantially concentric ring-like regions is created by applying substantially concentric ring-like optical fiber bundles to the workpiece, the ring-like fiber bundles having different radii and widths.

3. The method according to claim 1, wherein said array of substantially concentric ring-like regions is created by creating an illuminating spot on the workpiece and scanning the workpiece with the illuminating spot while rotating the workpiece with a predetermined velocity and providing a relative displacement between the workpiece and the illuminating spot along a radius of the workpiece.

4. The method according to claim 3, wherein a velocity of said displacement between the workpiece and the illuminating spot decreases from the center of the workpiece towards the edge.

5. The method according to claim 3, wherein a velocity of said displacement between the workpiece and the illuminating spot along a radius of the workpiece is substantially constant and the size of the illuminating spot is variable.

6. The method according to claim 5, wherein said illuminating spot has a slit-like shape.

7. The method according to claim 1, wherein said illumination is substantially normal to a surface of the workpiece.

8. The method according to claim 7, wherein said illumination uses polarized light.

9. The method according to claim 1, wherein said illumination is oblique to a surface of the workpiece.

10. The method according to claim 9, wherein said illumination uses polarized light.

11. The method according to claim 1, wherein said detecting of light responses is performed by a spectrophotometer.

12. A method for use in measurements of a wafer's top layer radial thickness distribution, the method comprising illuminating a plurality of measurement sites in a wafer workpiece and detecting light responses of the measurement sites, wherein the plurality of measurement sites define an array of substantially concentric ring-like regions such that an area defined by the measurement sites within one of the substantially concentric ring-like regions is substantially equal to that of the other substantially concentric ring-like region, and measuring a top layer radial thickness distribution of said workpiece in the measurement sites within one of the substantially concentric ring-like regions.

13. The method according to claim 12, wherein said array of substantially concentric ring-like regions is created by substantially concentric ring-like optical fiber bundles applied to the workpiece, the ring-like fiber bundles having different radii and widths.

14. The method according to claim 12, wherein said array of substantially concentric ring-like regions is created by creating an illuminating spot on the workpiece and scanning the workpiece with the illuminating spot while rotating the workpiece with a predetermined velocity and providing a relative displacement between the workpiece and the illuminating spot along a radius of the workpiece.

15. The method according to claim 12, wherein said illumination is substantially normal to a surface of the workpiece.

16. The method according to claim 15, wherein said illumination uses polarized light.

17. The method according to claim 12, wherein said illumination is oblique to a surface of the workpiece.

18. The method according to claim 17, wherein said illumination uses polarized light.

19. The method according to claim 12, wherein said detecting of light responses is performed by a spectrophotometer.

20. An optical system for use in measurements of thin films of a workpiece, the system comprising an illuminator assembly, a detector assembly, and a light directing assembly for directing illuminating light to a plurality of measurement sites in the workpiece arranged in an array of substantially concentric ring-like regions, such that an area defined by the measurement sites within one of the substantially concentric ring-like regions is substantially equal to that of the other substantially concentric ring-like region.

21. The system according to claim 20, wherein said light directing assembly is formed by a plurality of fiber-optic bundles, each ended by ring-like optical fixtures.

22. The system according to claim 21, further comprising a light distribution assembly.

23. The system according to claim 22, wherein said light distribution assembly comprises a rotatable mirror.

24. The system according to claim 21, wherein said fiber-optic bundles have substantially equal cross-sections.

25. The system according to claim 21, wherein said fiber-optic bundles are formed by substantially equal numbers of optical fibers with substantially equal cross-sections.

26. The system according to claim 20, wherein said detector assembly comprises a spectrophotometer.

27. The system according to claim 20, further comprising a polarizer in the light directing assembly.

28. An optical measurement system for measurements of thin films of a workpiece, the system comprising a handler for handling the workpiece, illuminator assembly, a detector assembly, and a light directing assembly for directing illuminating light to a plurality of measurement sites in the workpiece arranged in an array of substantially concentric ring-like regions, such that an area defined by the measurement sites within one of the substantially concentric ring-like regions is substantially equal to that of the other substantially concentric ring-like region.

29. The system according to claim 28, wherein said handler is rotatable and movable along a horizontal axis.

30. The system according to claim 28, wherein said handler is rotatable and said light directing assembly is movable along a horizontal axis.

* * * * *